United States Patent [19]

Bollinger

[11] 4,167,616

[45] Sep. 11, 1979

[54] POLYMERIZATION WITH DIBORANE ADDUCTS OR OLIGOMERS OF BORON-CONTAINING MONOMERS

[75] Inventor: Joseph M. Bollinger, North Wales, Pa.

[73] Assignee: Rohm and Haas Company, Philadelphia, Pa.

[21] Appl. No.: 826,230

[22] Filed: Aug. 22, 1977

[51] Int. Cl.$^2$ ............................. C08F 4/44; C08F 2/06
[52] U.S. Cl. ................................ 526/197; 260/665 R; 526/328; 526/329; 526/344; 526/346; 528/4
[58] Field of Search ................................. 526/197, 196

[56] References Cited

U.S. PATENT DOCUMENTS 3,061,603  10/1962  Calfee ................................... 526/197

FOREIGN PATENT DOCUMENTS 865651  4/1961  United Kingdom ..................... 526/197

OTHER PUBLICATIONS

Encyclopedia of Chem. Tech., Interscience Publ., (N.Y.), 1964, pp. 714, 715.

Primary Examiner—C. A. Henderson
Attorney, Agent, or Firm—Patrick C. Baker

[57] ABSTRACT

Polymerizable monomers are polymerized in a reaction mixture containing as catalysts (A) an oxygen source and (B) an organic boron compound which is soluble in the reaction mixture, the boron compound being (1) a diborane adduct wherein the boron atoms are linked by a hydrocarbyl group having an aliphatic carbon atom bonded to at least one of the boron atoms, or (2) oligomers based on repeating units containing at least two boron atoms linked by hydrocarbyl groups having an aliphatic carbon atom bonded to at least one of the boron atoms. The diborane adducts include the adduct of borane or a dialkylborane and 1,3-butadiene. The oligomers include polymers of diborane/propadiene adducts. The organoboron catalysts provide rapid initiation of polymerization and the polymerization is relatively insensitive to oxygen concentration, thereby permitting polymerization at ambient temperatures.

17 Claims, No Drawings

POLYMERIZATION WITH DIBORANE ADDUCTS OR OLIGOMERS OF BORON-CONTAINING MONOMERS

BACKGROUND OF THE INVENTION

This invention relates to a free radical polymerization in the presence of an oxygen source and a select class of organoboron catalysts.

The initiation of polymerization of vinyl monomers using trialkylboranes in the presence of oxygen, air, peroxide, or other oxygen source is known. One of the advantages of organoboron initiators is ability to initiate polymerization at low temperatures. Peroxides and azo initiators when used alone usually require considerable heat input to decompose and thereby to generate free radicals. Elevation of the temperature, however, often causes significant reduction in molecular weight of the polymer accompanied by loss of important properties of the polymer. Representative of the prior art which discloses the use of organoboron catalysts for vinyl polymerization are U.S. Pat. Nos. 3,476,727, 3,633,490, 2,985,633 and British Pat. No. 1,113,722.

Despite advances in the art as represented by the foregoing prior art, organoboron catalyzed polymerizations tend to be unduly sensitive to the concentration of oxygen in the polymerization system. Too little oxygen results in little or no polymerization because it is believed that at the low concentrations of trialkylboranes present in such systems, the bimolecular reaction between trialkylborane and dialkylalkylperoxyborane (the latter being produced by reaction of trialkyl borane with oxygen), required for production of free radicals and initiation of polymerization, is unduly slow. If too much oxygen is present, little or no polymerization will occur because all of the trialkyl borane is rapidly transformed to dialkylalkylperoxyboranes which will initiate polymerization only at elevated temperatures. Moreover, polymerization is often inhibited by oxygen.

The foregoing reactions are illustrated by the following equations where R is an organic radical such as n-butyl:

$$(R)_3B + O_2 \rightarrow (R)_2BO_2R \qquad (1)$$

$$(R)_2BO_2R + (R)_3B \rightarrow [(R)_2B\text{—}O.] + (R)_2BOR + R. \qquad (2)$$

Because the organoboron catalysts of the invention contain at least two boron atoms, the bimolecular reaction between trialkylborane and dialkylalkylperoxyborane and resultant production of free radicals is greatly facilitated by neighboring group participation and is largely insensitive to oxygen concentration and reaction temperature.

The following equations illustrate the formation of free radicals from the organoboron catalysts of the invention, where the diborane catalyst typically is the adduct of borane ($BH_3$) and 1,3-butadiene (prepared in tetrahydrofuran, THF):

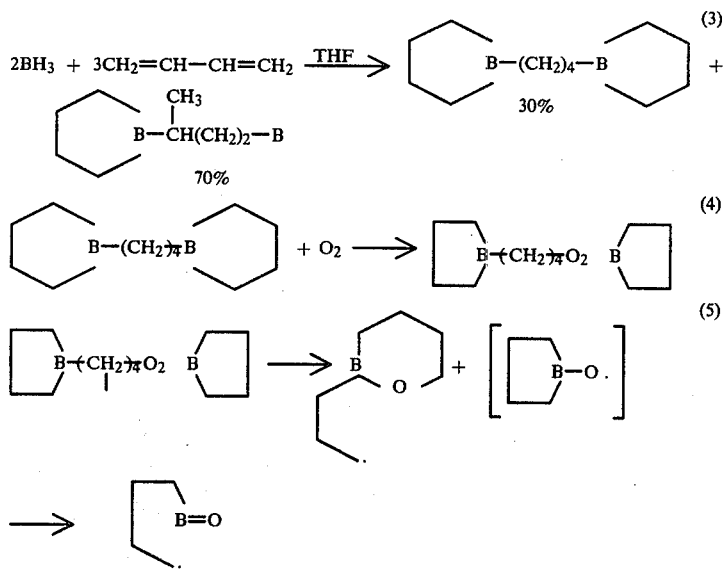

SUMMARY

The catalysts of the invention are either diborane adducts or oligomers based on monomer units which contain at least two boron atoms. The two boron atoms of the diboranes and at least two of the boron atoms in the monomers are linked by hydrocarbyl groups having an aliphatic carbon atom which is bonded to at least one of the linked boron atoms. The bridging hydrocarbyl groups may also contain alkyl, cycloalkyl or aryl groups either as part of the chain linking the boron atoms or as branches. The remaining substituents on the boron atoms satisfying the valency of boron may be hydrogen, alkyl, cycloalkyl or aryl.

DETAILED DESCRIPTION

A preferred class of diborane adducts is represented by the following formula (I):

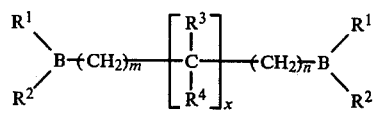

where x is 0 to 6 and m and n are each 0 or 1, provided that the sum of x, m and n is at least 1, and where $R^1$, $R^2$, $R^3$ and $R^4$ independently are hydrogen, alkyl cycloalkyl or aryl, and where $R^1$ together with $R^2$ and the boron atom to which $R^1$ and $R^2$ are attached may form a ring containing 2 to 14 carbon atoms, such boron atom being a member of the ring or bridging the ring.

A preferred class of organoboron polymers is represented by the following formula (II) of the repeating units comprising the oligomer:

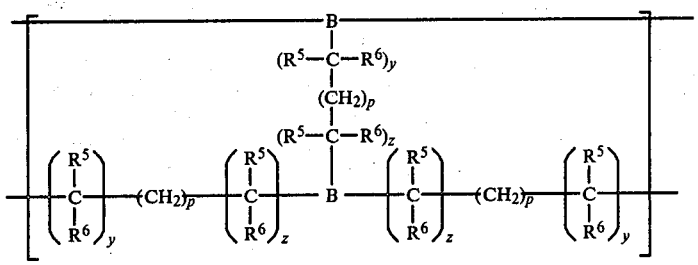

II where y and z are each 0 to 5 and p is 0 or 1 provided that the sum of y, z and p is at least 1; where $R^5$ and $R^6$ independently are hydrogen, alkyl, cycloalkyl or aryl, and where terminal carbon atoms of one unit are attached to separate boron atoms in adjacent units, and the terminal boron atom of one unit being joined to separate terminal carbon atoms of adjacent units.

Typical of the alkyl groups ($R^1$ to $R^6$) are methyl, ethyl, propyl, butyl, hexyl and higher alkyl groups such as octyl, nonyl, dodecyl, tridecyl, tetradecyl, octadecyl, and the like, including isomers thereof. Lower alkyl (containing 1-7 carbon atoms) groups are preferred. Typical cycloalkyl groups include cycloheptyl, cyclohexyl, and cyclodecyl. Typical aryl groups include phenyl, naphthyl and alkyl substituted derivatives thereof, such as mono-, di- and trialkyl substituted phenyl of which tolyl is representative. Representative of terminal groups wherein $R^1$ and $R^2$ together with the boron atoms to which $R^1$ and $R^2$ are attached form a ring in adducts of formula I is the following:

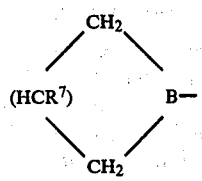

wherein $R^7$ is a radical selected from hydrogen, alkyl and aryl and q is an integer from 2 to 4. Typical cyclic radicals are:

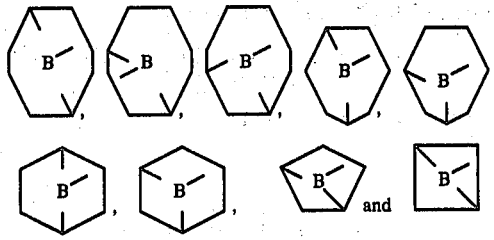

The foregoing diborane adducts are prepared by techniques known in the art, such as by contacting borane or a dialkylborane with an alkadiene such as the following, including any mixtures thereof:
2-methyl-1,3-butadiene (isoprene)
2,3-dimethyl-1,3-butadiene
1,4-hexadiene
1,5-hexadiene
1,3-pentadiene (piperylene)
2,5-dimethyl-2,4-hexadiene
1,4-pentadiene
3,4-dimethyl-2,4-hexadiene
1,3-heptadiene
1,4-heptadiene
1,5-heptadiene
1,6-heptadiene
cyclopentadiene
1,4-cyclohexadiene
1,3-cyclohexadiene
1,3-cycloheptadiene
1,4-cycloheptadiene
1,3-cyclooctadiene
1,4-cyclooctadiene
1,5-cyclooctadiene
norbornadiene
1,9-decadiene
1,7-octadiene Typical dienes have the formula $H_2C=CR^3(CHR^3)_xCR^3=CH_2$ where $R^3$ and x are as defined above. When borane is reacted with an acyclic alkadiene, the alkadiene cyclizes and reacts with the boron atoms to form terminal cycles containing the boron atoms. However, when a dialkylborane is reacted with the acyclic alkadiene, the alkadiene does not cyclize with the boron atoms but merely links the boron atoms of the dialkyl borane as in the following reaction:

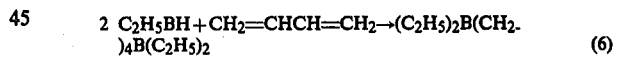

Typical diborane adducts useful in the present invention are the following:
1,4-bis(1-boracyclopentyl)butane
1,4-bis(1-bora-3-methylcyclopentyl)-2-methylbutane
1,4-bis(1-boracyclopentyl)-2-methylbutane
1,4-bis(1-bora-3,4-dimethylcyclopentyl)butane
1,4-bis(1-bora-3,4-dimethylcyclopentyl)-2,3-dimethylbutane
1,4-bis(1-bora-3-phenylcyclopentyl)-2-phenylbutane
1,4-bis(1-bora-3,4-diphenylcyclopentyl)-2,3-diphenylbutane
1,6-bis(1-boracycloheptyl)hexane
1,5-bis(1-boracyclohexyl)pentane
1,4-bis(9-borabicyclo[3.3.1]nonyl)butane
1,4-bis(7-borabicyclo[2.2.1]heptyl)butane
1,4-bis(9-borabicyclo[3.3.1]nonyl)pentane
1,4-bis(9-borabicyclo[3.3.1]nonyl)hexane
1,4-bis(9-borabicyclo[3.3.1]nonyl)-2-methylbutane
1,4-bis(9-borabicyclo[3.3.1]nonyl)-2,3-dimethylbutane
1,4-bis(7-borabicyclo[2.2.1]heptyl)-2-methylbutane 1,4-bis(7-borabicyclo[2.2.1]heptyl)-2,3-dimethylbutane
1,4-bis(9-borabicyclo[3.3.1]-2-phenylbutane
1,4-bis(7-borabicyclo[2.2.1]heptyl)-2-phenylbutane
1,4-bis(diisoamylboranyl)butane
1,4-bis(dipentylboranyl)butane
1,4-bis(3,5-dimethylborinayl)butane The foregoing and other diborane adducts are described in U.S. Pat. No. 3,008,997 together with synthesis.

The organoboron oligomers useful in the invention are prepared by reacting diborane with cumulated alkadienes as described in U.S. Pat. No. 3,014,075 or with noncumulated alkadienes in which the groups containing the double bonds are separated by about six or more carbon atoms such that the rate of intermolecular reaction becomes greater than the rate of intramolecular reaction (ring formation). Reactants and reaction conditions are selected to provide oligomers rather than high molecular weight polymers. High molecular weight polymers tend to be insoluble in the reaction medium of a vinyl polymerization process and therefore cannot be used. The solubility of the polymer should be at least equivalent to that of the oxygen in the reaction system containing the monomers to be polymerized. Accordingly, the oligomers may be selected on the basis of the oxygen solubility in the particular monomer system. Typical molecular weight ranges for useful oligomers are from about 300 to about 10,000 preferably about 1,000 to about 5,000, on a number average molecular weight basis.

Typical of the cumulated alkadiene reactants are those of the formula $R^5HC=C=CHR^5$ where $R^5$ is as defined above. Representative cumulated alkadienes are propadiene, 1,2-butadiene, 1,2-pentadiene, 1,2-hexadiene, 1,2-heptadiene, 2,2-dimethyl pentadiene-3,4, 2-methyl pentadiene-3,4, 2-methyl hexadiene-4,5, 2,3-pentadiene and 2,3-hexadiene. Representative noncumulated alkadienes are 1,9-decadiene, 1,10-undecadiene, 1,11-dodecadiene, 1,13-tetradecadiene, and the like.

While the foregoing describes adducts and oligomers prepared from alkadienes, the invention also includes adducts and oligomers prepared from olefinic or acetylenic compounds containing more than two unsaturated groups, from sequential addition of mono-olefins and polyolefins and/or acetylenic compounds, or from mixtures of mono-olefins with polyolefins and/or acetylenic compounds. The essential characteristic of useful organoboron compounds of the invention is satisfied by all of such products, namely, the boron atoms (two or more) are linked by a hydrocarbyl group having an aliphatic carbon atom bonded to at least one of the boron atoms, such that the linkage is cleaved in the initiation reaction.

U.S. Pat. Nos. 3,008,997 and 3,014,075 disclose the use of diborane in preparing organoborane compounds. However, the compounds of the patents and other compounds within the scope of the present invention are more conveniently prepared from borane ($BH_3$) by complexing borane with an ether or other hydroborating solvent as described by H. C. Brown and coworkers in the patent and other literature. See, for example, U.S. Pat. No. 3,345,418. Typical complexing solvents are tetrahydrofuran and diethylene glycol dimethyl ether.

Monomers polymerized in the presence of the organoboron catalysts of the invention include any polymerizable $\alpha,\beta$-ethylenically unsaturated monomer or monomers such as those of the formula:

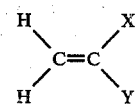

wherein X and Y independently are hydrogen, hydrocarbon radicals, hydrocarbon radicals substituted with one or more atoms or groups which do not interfere in the polymerization, or non-hydrocarbon groups which do not interfere in the polymerization. Accordingly, X and Y can be hydrogen, alkyl, halogen (preferably chloro, bromo, or fluoro), carboxyl, cycloalkyl, aryl, vinyl, cyano, acyl, acyloxy, aryloxy, carboalkyloxy and carboaryloxy, such as acetate, formate and the like. Mixtures of any of the monomers can also be used to form copolymers such as copolymers with ethylene, propylene, 1-butene, isobutylene, methallyl chloride, other 1-olefins, etc. Representative of the polymerizable monomers are: alpha olefins such as propylene, 1-butene, isobutylene, 3-methyl-1-butene, 4-methyl-1-pentene, and the like; vinyl halides such as vinyl chloride, vinyl bromide, vinyl fluoride, vinylidene chloride, allyl chloride and the like; vinyl esters such as vinyl acetate, vinyl propionate, vinyl benzoate, vinyl isobutyrate, vinyl laurate, vinyl hexanoate and the like; styrene, acrylic and methacrylic acids and their esters, nitriles, amines and anhydrides such as ethyl acrylate, methyl acrylate, methyl methacrylate, ethyl methacrylate, acrylonitrile, acrylamide and the like; and compounds having a plurality of ethylenic double bonds such as butadiene, 2-chlorobutadiene and the like.

The oxygen source can be air, purified molecular oxygen, an oxygen generating compound such as a peroxide, or more conveniently can be the oxygen normally found dissolved in the monomers to be polymerized. For example, the mole fraction of oxygen estimated in methyl methacrylate at 25° C. is $2.2 \times 10^{-4}$ and in styrene is $1.8 \times 10^{-4}$. Such oxygen levels are sufficient for reaction with the organoboron catalysts in the initiation of polymerization. Generally, equimolar proportions of oxygen and the organoboron catalyst should be present. The oxygen can also be used to control the rate of polymerization and therefore can be added batchwise, continuously or semi-continuously to the polymerizable system. The oxygen may be introduced with the monomers or added separately after admixture of the monomers and the organoboron initiator. Typically, the organoboron catalyst is present in the reaction mixture at a concentration of about 0.01 to about 2.0 weight percent based upon polymerizable monomers, preferably about 0.1 to about 0.5 weight percent. Usually, a temperature range of about $-78°$ C. to about 150° C., preferably $-30°$ C. to 50° C., will be effective at atmospheric pressure, but pressure and temperature may be varied as desired to improve the yield of polymer. Other conditions of polymerization do not differ substantially from those known in the art, such as the conditions described in U.S. Pat. No. 2,985,633.

While the organoboron catalysts are effective in a pressure system for the polymerization of ethylene or other olefin, alone or in admixture with other monomers, other polymerizable systems are also effective, including emulsion, suspension, solution, and bulk polymerization techniques. All of these polymerization systems and methods are known, such as described in U.S. Pat. Nos. 2,744,886 and 2,985,633.

Polymers prepared with the organoboron catalyst systems of the invention accordingly may be prepared as solutions, emulsions, suspensions, beads, molding powders, and casting syrups, depending upon the monomer systems and end use desired.

The following examples further illustrate the invention. Unless otherwise indicated, all parts and percentages are by weight and temperatures are in degrees centigrade.

In the examples, "GPC" means gel permeation chromatography, "$\overline{M}_n$" means number average molecular weight, "$\overline{M}_w$" refers to weight average molecular weight, and "MEHQ" is methyl ether hydroquinone.

EXAMPLE 1

Continuous Solution Polymerization of 2-Ethylhexyl Acrylate and n-Butyl Acrylate with Isobutylene A continuous-flow-stirred tank-reactor (CFSTR) utilizing a 2 liter stirred autoclave as the tank was filled with isobutylene and the addition of a 75:25 mixture of 2-ethylhexyl acrylate:n-butyl acrylate and isobutylene was begun at such a rate as to maintain a 2:1 wt. ratio of isobutylene:acrylate with an average residence time of 1.25 hr. Simultaneously, the addition of a 0.21 M solution of the adduct from 2 moles of borane and 3 moles of 1,3-butadiene in 50:50 (volume) tetrahydrofuran:toluene solvent was begun at such a rate as to maintain the initiator at a concentration of 0.25 wt. % based on total monomers. Temperature was maintained at 25°-27° C. After equilibration of the reactor, a polymer sample was collected by precipitation into a 5-fold excess (volume) of methanol at a rate of 140 g./hr. of polymer stripped of volatiles. The polymer contained 17.3 wt. % isobutylene and had a GPC $\overline{M}_n = 180,000$.

EXAMPLE 2

Batch Solution Polymerization of 2-Ethylhexyl Acrylate and n-Butyl Acrylate with Isobutylene To a 1 liter 3-necked Morton flask equipped with a magnetic stirrer, dry-ice condenser, N$_2$ inlet, and thermometer were charged 167 g. of mixed acrylates (125.2 g of 2-ethylhexyl acrylate containing 50 ppm MEHQ inhibitor, and 41.8 g. of n-butyl acrylate containing 15 ppm MEHQ). After cooling the acrylates to −10° C., 307 g. of isobutylene was added as a liquid. The reaction mixture was stirred magnetically and when reflux had been established (−5° C.), an addition (by syringe) of 1 ml. of 0.46 M adduct of 2 moles BH$_3$:3 moles 1,3-butadiene in tetrahydrofuran was made. Three more additions of 1 ml. of initiator solution were made at 40 min. intervals. Ten minutes after the 4th initiator shot, 2 ml. of air was added. One hour later, another 1 ml. of initiator solution was added, followed by 3 more 1 ml. additions at 40 min. intervals. Ten minutes after the 8th initiator shot, 3 additions of 2 ml. of air were made. Ten minutes after the last air addition, polymer was precipitated by pouring the isobutylene solution in twice its volume of methanol. There was obtained 160 g. of polymer, containing 17.5 wt. % isobutylene, after stripping the polymer of volatiles.

EXAMPLE 3

Batch Solution Polymerization of 2-Ethylhexyl Acrylate and n-Butyl Acrylate with Isobutylene To an evacuated 1 liter stirred autoclave were added 15 ml. of 0.46 M adduct of 2 moles of BH$_3$ to 3 moles of 1,3-butadiene in tetrahydrofuran and 400 mls of isobutylene. While stirring at room temperature 25°-27° C., 120 mls. of a 75:25 mixture of 2-ethylhexyl acrylate:butyl acrylate was added at a rate of 10 ml./hr. for 12 hr. Stirring was continued one additional hour, and the autoclave contents precipitated in 1500 ml of methanol. There were obtained 55 g. of polymer containing 17.7 wt % isobutylene after stripping the polymer of volatiles.

EXAMPLE 4

Emulsion Polymerization of Isobutylene and Acrylates

In a 2 liter 3-neck Morton flask were mixed 200 ml. deionized water, 12 g. octyl phenol/ethylene oxide (9-10 moles) surfactant, 75 g. 2-ethylhexyl acrylate, 25 g. n-butyl acrylate, and 100 ml. reagent grade acetone. The solution was cooled to −10° C. and 400 ml of liquid isobutylene were added. Vigorous stirring caused formation of an emulsion. The temperature of the reaction mixture was controlled by reflux of the isobutylene (dry ice-acetone condenser). Initiator solution was prepared from 10 ml. of borane.tetrahydrofuran complex and 0.8 g. 1,3-butadiene and added in 1 ml. portions at 20 min. intervals. When about one-half of the initiator had been added, 20 ml. of air was added by syringe and when all of the initiator had been added, an additional 20 ml. of air was added. Stirring was continued for one hour after the last air addition and product isolated by precipitation in methanol. There were isolated 15.0 g. of dry polymer which was composed of 80.7 wt. % acrylate monomers and 19.3 wt. % isobutylene.

EXAMPLE 5

Solution Copolymerization of Styrene and n-Butyl Acrylate

In a 500 ml 3-neck flask which had been purged of air with N$_2$ were added 100 g. of styrene, 100 g. toluene (reagent) and about 20 g. of n-butyl acrylate. To this solution was added 20 ml. of an initiator solution prepared from 60 ml. of borane.tetrahydrofuran complex and 4.6 g 1,3-butadiene. The reaction mixture was stirred for 16 hrs. and product isolated by precipitation in methanol. There was obtained 33 g. of product which was shown to be a copolymer of styrene and butyl acrylate by IR and NMR spectroscopy.

EXAMPLE 6

Solution Polymerization of Vinyl Chloride

To an evacuated 1 liter stirred autoclave were charged 200 g. of reagent benzene and 100 g. of vinyl chloride (polymerization grade). To this stirred solution were added 20 ml. of an initiator solution prepared from 60 ml. of borane.tetrahydrofuran complex and 4.6 g. 1,3-butadiene in 2 ml. portions at 20 min. intervals. When the last portion of initiator had been added, the reactor was stirred an additional 4 hr. at ambient temperature and the contents added to 2 liters of methanol. There was obtained by filtration 57 g. of solid whose IR spectrum indicated poly(vinyl chloride).

EXAMPLE 7

Bulk Polymerization of Methyl Methacrylate

In a 2 oz. wide-mouth bottle were placed 25 g. of methyl methacrylate (uninhibited) and 1 ml. of catalyst solution prepared from 4.6 g. 1,3-butadiene and 60 ml. of borane.tetrahydrofuran. The solution was mixed, loosely capped, and allowed to stand at ambient temperature. At the end of 1 hr. the monomer had become a syrup and an additional 1 ml. of a catalyst solution was added. The solution was stirred until a homogeneous mixture resulted, and allowed to stand. After 16 hr. a hard, clear polymer resulted, having (by GPC) a $\overline{M}_w=970,000$, $\overline{M}_n=78,900$ and $\overline{M}_w/\overline{M}_n=12.29$.

EXAMPLE 8

Solution Polymerization of Styrene

To a 300 ml. 3-neck flask were charged 90 g. styrene and 100 ml. benzene. To this solution was added 8 ml. of catalyst solution prepared as in Example 7. While stirring at ambient temperature (25° C.), air was introduced under the surface of the liquid by means of a 20 gauge syringe needle at a rate of 60 bubbles/min. Polymerization became evident after about 15 mins. and a mild exotherm (to 35° C.) occurred. When the exotherm had subsided an additional 8 ml. of catalyst solution was added and another mild exotherm occurred (to 33° C.). Stirring was continued for another hr. Polymer was isolated by precipitation into 2 qts. of methanol. There was obtained 15.6 g. of dry polymer. GPC showed $\overline{M}_n=10,800$, $\overline{M}_w=24,700$, and $\overline{M}_w/\overline{M}_n=2.28$. A second polymerization gave a product having $\overline{M}_n=14,600$, $\overline{M}_w=37,500$ and $\overline{M}_w/\overline{M}_n=2.56$. The IR spectrum of the material showed it to be amorphous polystyrene. Styrene cannot be readily polymerization using a trialkyl borane as initiator. The invention therefore provides a new and efficient route to polystyrene.

EXAMPLE 9

The procedure of Example 1 is repeated in all essential respects using isodecyl acrylate in place of 2-ethylhexyl acrylate and, as the organoboron catalyst, the adduct from 2 moles of borane.THF complex and 3 moles of isoprene. A polymeric product results.

EXAMPLE 10

The procedure of Example 3 is repeated in all essential respects using isodecyl acrylate in place of 2-ethylhexyl acrylate and, as the organoboron catalyst, the adduct from 100 mls. of 1 M borane.THF complex and 10.2 g. of piperylene (trans-isomer). A polymeric product results.

EXAMPLE 11

The procedure of Example 5 is repeated in all essential respects using n-hexyl acrylate in place of n-butyl acrylate and, as organoboron catalyst, the adduct from 50 mls. of 1 M borane.THF complex and 6.15 g. of 1,5-hexadiene. A polymeric product results.

EXAMPLE 12

The procedure of Example 5 is repeated in all essential respects using isodecyl acrylate in place of styrene and n-butyl acrylate, and as organoboron catalyst, the adduct from 50 ml. of 1 M borane.THF complex and 7.0 g. of 2-methyl-2-butene, followed by 1.7 g. of isoprene. A polymeric product results.

EXAMPLE 13

The procedure of Example 5 is repeated in all essential respects using, as organoboron catalyst, the adduct from a 0.5 M solution of 9-borabicyclo[3.3.1]nonane in THF and 0.34 g. of isoprene. A polymeric product results.

EXAMPLE 14

Polymerization With Boron Oligomer

To a 1 liter flask which had been flushed with $N_2$ is added 12 ml. of 1 M borane.tetrahydrofuran complex and to this is added dropwise 1.5 g. of 1,9-decadiene while maintaining the temperature near 0° C. by means of an ice bath. A white precipitate forms and heat is evolved during the olefin addition when all of the olefin is charged, tetrahydrofuran is removed under vacuum while heating to 40° C. with a water bath. The product is a boron oligomer. The flask is then cooled with a dry ice-acetone bath and 400 ml of isobutylene are added followed by 50 g. of n-butyl acrylate and 50 g. of isodecyl acrylate. The flask is stirred with a paddle stirrer and the temperature allowed to rise to the reflux temperature of isobutylene (about −5° C.) which temperature is then held by means of a dry-ice acetone condenser. Air is slowly passed through the reaction mixture. An aliquot is removed after 3 hours and the formation of polymer demonstrated by admixture with methanol. After 6 hours, the reaction mixture is precipitated by pouring into 800 ml of methanol. There is obtained 78.6 g. of polymer after vacuum stripping which contains 18.5 weight % isobutylene (by C, H, and O microanalysis).

I claim:

1. A process for the polymerization of polymerizable $\alpha,\beta$-ethylenically unsaturated monomers which comprises polymerizing said monomers in a reaction mixture containing catalytic amounts of (A) an oxygen source and (B) an organic boron compound which is soluble in the reaction mixture, said boron compound selected from (1) diborane adducts wherein the boron atoms are linked by a hydrocarbyl group having an aliphatic carbon atom bonded to at least one of the boron atoms, and (2) oligomers based on repeating units containing at least two boron atoms linked by hydrocarbyl groups having an aliphatic carbon atom bonded to at least one of the boron atoms, said diborane adducts having the formula:

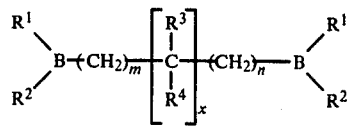

where x is 0 to 6 and m and n are each 0 or 1, provided that the sum of x, m and n is at least 1, and where $R^1$, $R^2$, $R^3$ and $R^4$ independently are hydrogen, alkyl, cycloalkyl or aryl, and where $R^1$ together with $R_2$ and the boron atom to which $R^1$ and $R^2$ are attached may form a ring containing 2 to 14 carbon atoms, such boron atom being a member of the ring or bridging the ring; and said repeating units of said oligomers having the formula:

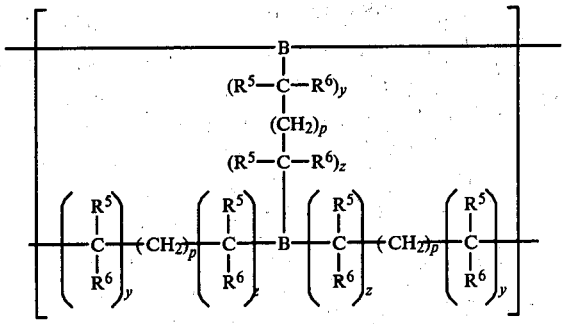

where y and z are each 0 to 5 and p is 0 or 1 provided that the sum of y, z and p is at least 1; where $R^5$ and $R^6$ independently are hydrogen, alkyl, cycloalkyl or aryl, and where terminal carbon atoms of one unit are attached to separate boron atoms in adjacent units, and the terminal boron atom of one unit being joined to separate terminal carbon atoms of adjacent units.

2. A process as in claim 1 wherein the boron compound is said diborane adduct (1).

3. A process as in claim 1 wherein the boron compound (1) is an adduct of borane or diborane and an alkadiene of the formula $H_2C=CR^3(CHR)_xCR^3=CH_2$ wherein $R^3$ is hydrogen, alkyl, cycloalkyl or aryl, and x is 0 to 6.

4. A process as in claim 1 wherein the boron compound is an adduct of borane and 1,3-butadiene.

5. A process as in claim 1 wherein the boron compound is an adduct of borane and isoprene.

6. A process as in claim 1 wherein the boron compound is an adduct of borane and 1,5-hexadiene.

7. A process as in claim 1 wherein the boron compound is an adduct of borane and 1,3-pentadiene.

8. A process as in claim 1 wherein the boron compound is an adduct of dihexylborane and isoprene.

9. A process as in claim 1 wherein the polymerizable monomers include at least one of an acrylic, a methacrylic, an alpha olefin, styrene, a vinyl halide, and a vinyl ester.

10. A process as in claim 1 wherein the polymerizable monomers comprise a mixture of 2-ethylhexyl acrylate, n-butyl acrylate and isobutylene.

11. A process as in claim 1 wherein the polymerizable monomers comprise a mixture of styrene and n-butyl acrylate.

12. A process as in claim 1 wherein the polymerizable monomer is vinyl chloride.

13. A process as in claim 1 wherein the polymerizable monomer is methyl methacrylate.

14. A process as in claim 1 wherein the polymerizable monomer is styrene.

15. A process as in claim 1 wherein the boron compound is said oligomer (2).

16. A process as in claim 15 wherein said oligomer (2) is prepared by reacting diborane and an alkadiene of the formula $R^5HC=C=CHR^5$ wherein $R^5$ is hydrogen, alkyl, cycloalkyl or aryl, and the oligomer has a number average molecular weight of about 300 to 10,000.

17. A process as in claim 15 wherein said oligomer (2) is prepared by reacting diborane and a noncumulated alkadiene in which the groups containing the double bonds are separated by about six or more carbon atoms, and the oligomer has a number average molecular weight of about 300–10,000.

* * * * *

UNITED STATES PATENT AND TRADEMARK OFFICE
CERTIFICATE OF CORRECTION

PATENT NO. : 4,167,616

DATED : September 11, 1979

INVENTOR(S) : Joseph M. Bollinger

It is certified that error appears in the above-identified patent and that said Letters Patent are hereby corrected as shown below:

<u>Col. 3, line 45</u> - Delete formula and in lieu thereof insert following corrected formula:

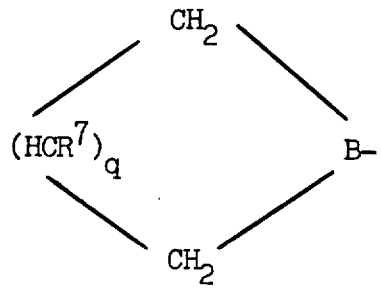

<u>Col. 5, line 3</u> - After figure "[3.3.1]" and before figure "-2" insert -- nonyl) --.

<u>Col. 9, line 28</u> - Delete word "polymerization" and in lieu thereof insert -- polymerized --.

UNITED STATES PATENT AND TRADEMARK OFFICE
CERTIFICATE OF CORRECTION

PATENT NO. : 4,167,616
DATED : September 11, 1979
INVENTOR(S) : Joseph M. Bollinger It is certified that error appears in the above-identified patent and that said Letters Patent are hereby corrected as shown below:

CLAIMS

Col. 10, line 62, Claim 1 - Delete "$R_2$" and in lieu thereof insert — $R^2$ —.

Col. 11, Claim 1, second formula from left - letter outside second bracket should be "z".

Signed and Sealed this

Twenty-second Day of January 1980

[SEAL]

Attest:

SIDNEY A. DIAMOND

Attesting Officer  Commissioner of Patents and Trademarks